United States Patent [19]

Sattler

[11] Patent Number: 5,927,730
[45] Date of Patent: Jul. 27, 1999

[54] SCOOTER CART

[75] Inventor: James L. Sattler, Fairfield Glade, Tenn.

[73] Assignee: James F. Sattler, Chattanooga, Tenn.

[21] Appl. No.: 09/164,760

[22] Filed: Oct. 1, 1998

Related U.S. Application Data

[63] Continuation-in-part of application No. 09/014,014, Jan. 27, 1998.

[51] Int. Cl.⁶ .................................................. B62B 1/00
[52] U.S. Cl. .................. 280/47.131; 280/652; 280/656
[58] Field of Search .................................. 280/32.7, 402, 280/652, 656, 657, 47.131

[56] References Cited

U.S. PATENT DOCUMENTS

| | | |
|---|---|---|
| 800,317 | 9/1905 | McLaughlin et al. . |
| 3,100,547 | 8/1963 | Rosenthal . |
| 3,485,314 | 12/1969 | Herr . |
| 4,119,331 | 10/1978 | Jackson . |
| 4,666,008 | 5/1987 | Shepard et al. . |
| 4,750,578 | 6/1988 | Brandenfels . |
| 4,828,282 | 5/1989 | Pinto . |
| 4,989,351 | 2/1991 | Shear . |
| 5,333,702 | 8/1994 | Gaffney et al. . |
| 5,463,853 | 11/1995 | Santoli et al. . |

*Primary Examiner*—Richard M. Camby
*Attorney, Agent, or Firm*—Rader, Fishman, Grauer & McGarry

[57] ABSTRACT

A cart having a platform base adapted to support a user and further including a connector assembly mounted to the front end of the base for rigidly connecting the base to a personal mobility vehicle and including a pair of swivel casters mounted to the underside of the platform base rearwardly of the connector for aiding the maneuverability of the cart when it is connected to the personal mobility vehicle. The connector assembly comprises a clamping mechanism to clamp onto a rear lifting handle in one embodiment and comprises two pair of vertically slidable plates one set of which is pivotally mounted to the front end of the platform and the other set of which are rigidly mounted to the rear portion of the cart in another embodiment. The cart further includes a support rail extending upwardly from the front end of the platform base and adapted to supply support to the user. The support rail is secured by a pair of side braces extending from the rear end of the platform base to the support rail.

39 Claims, 5 Drawing Sheets

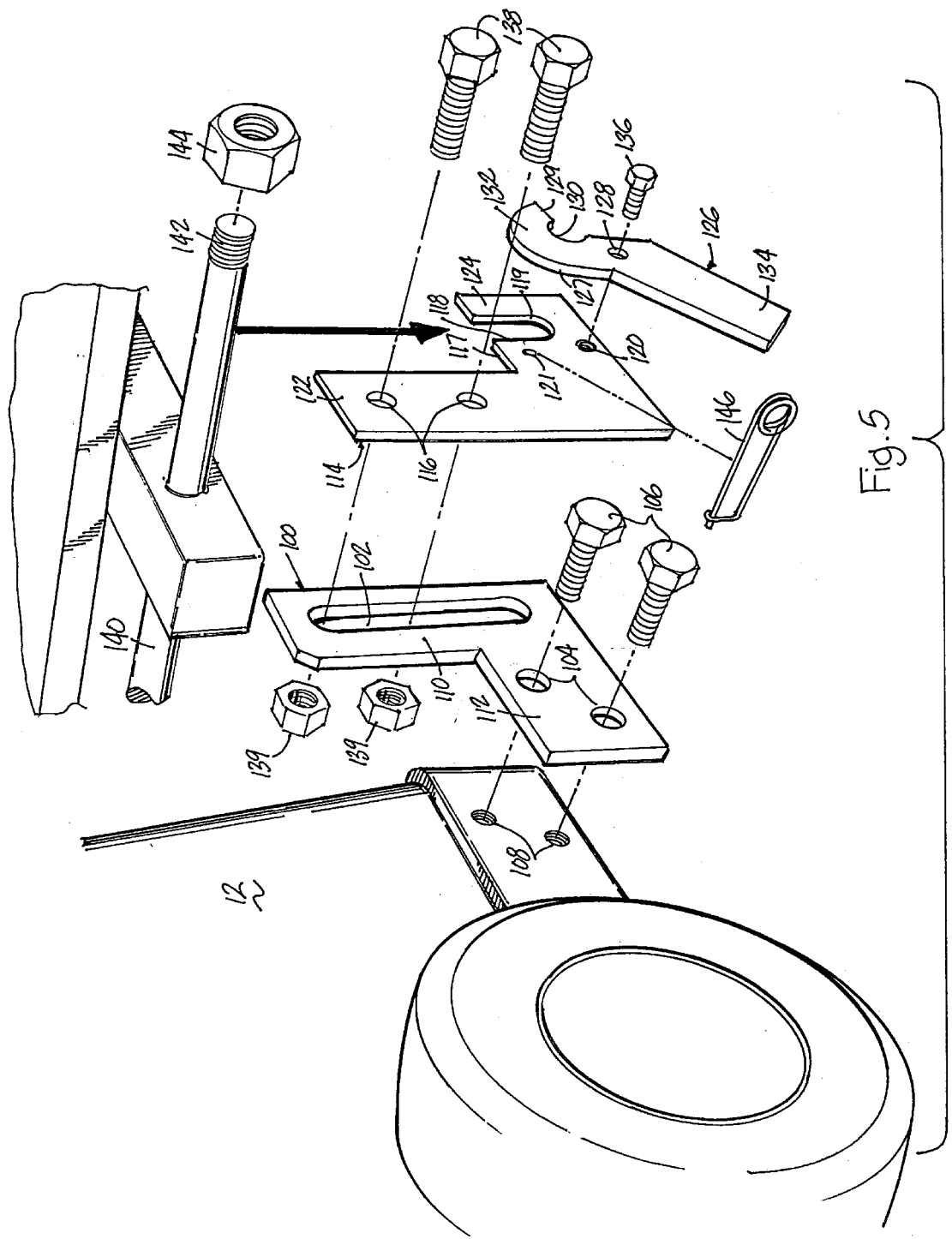

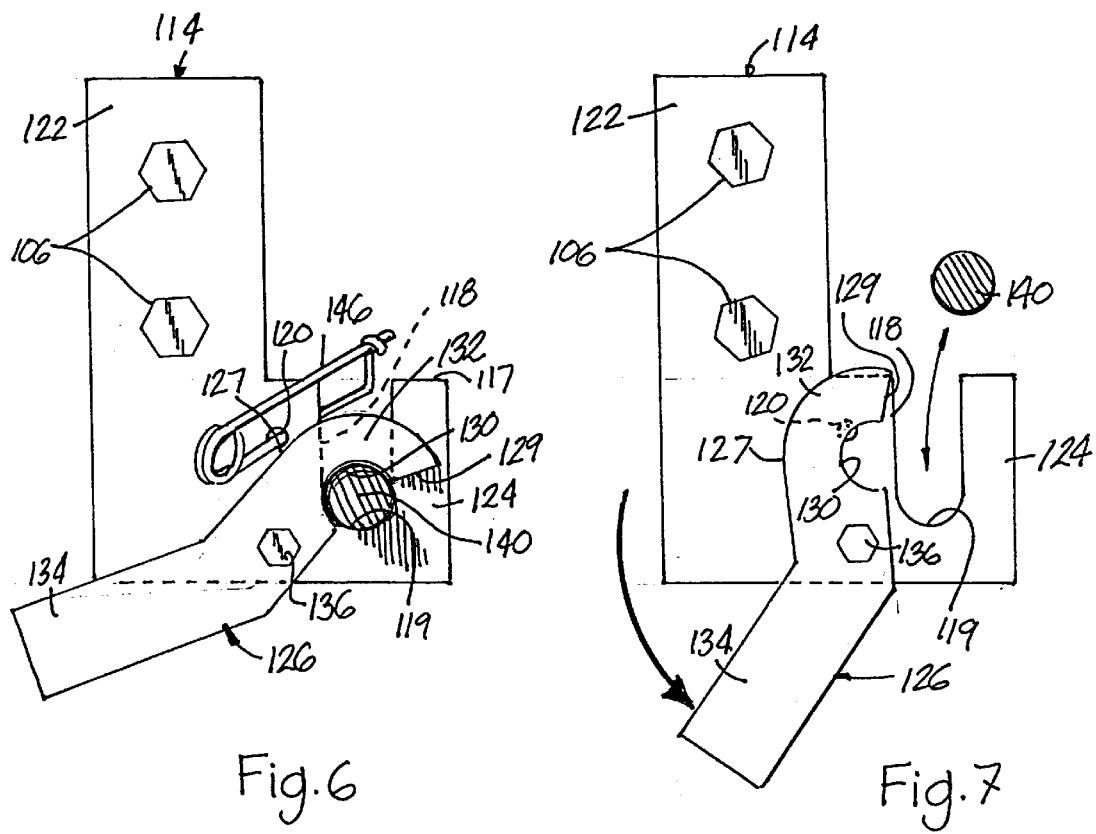

SCOOTER CART

CROSS REFERENCE TO RELATED APPLICATIONS

This application is a continuation in part of U.S. patent application Ser. No. 09/014,014, filed Jan. 27, 1998.

BACKGROUND OF THE INVENTION

1. Field of the Invention

This invention relates to detachable and collapsible carts and, more particularly, to detachable and collapsible carts for a personal mobility vehicle.

2. Description of the Related Art

Various companies including Burke, Orthokinetics, and Everest and Jennings manufacture personal mobility vehicles. Such carts are typically used by handicapped or disabled people to improve their mobility. It is very difficult, however, for any person accompanying the rider of the personal mobility vehicle to be able to keep up with the rider or travel the distances that the rider is able to travel.

In order to accommodate the person accompanying the rider, a cart can be attached to the personal mobility vehicle. The prior art includes examples of carts attached to motorized vehicles, but none are particularly adapted to accommodate the person accompanying the rider of the personal mobility vehicle. For example, U.S. Pat. No. 3,485,314 discloses a tractor having attached thereto a platform cart on which a person can stand while operating the motorized tractor. Also, U.S. Pat. No. 3,100,547 discloses a wheel chair having a monowheel trailer for carrying a storage battery. U.S. Pat. No. 4,828,282 discloses a powered mower having a cart on which the mower operator can stand while riding under the power of the mower. Finally, U.S. Pat. No. 4,989,351 discloses a snow thrower having a platform on which a person can stand while driving the self-propelled snow thrower.

SUMMARY OF THE INVENTION

According to the invention a detachable and collapsible cart includes a platform base having adapted to support a user and swivel casters mounted to an underside of the platform base. A connector assembly is mounted to the platform base and has brackets for mounting the platform base to a rear portion of a personal mobility vehicle so that the platform base is rigidly connected to the personal mobility vehicle at least with respect to a vertical axis. In one embodiment, the connector assembly brackets are adapted to mount to a horizontal lifting handle bar at the rear of the personal mobility vehicle. In another embodiment, the connector assembly brackets are adapted to mount to a rear frame portion at the rear of the personal mobility vehicle and include a set of height adjustable brackets which are adjustably connected to each other to mount the front end of the platform base to the rear of the personal mobility vehicle so that the cart is adapted to mount to many different types of personal mobility vehicles. The rigid mounting of the forward portion of the platform base to the personal mobility vehicle with respect to a vertical axis and the swivel casters at the rear portion of the platform base tie the cart to the personal mobility vehicle so that they move as one in both forward and reverse directions.

BRIEF DESCRIPTION OF THE DRAWINGS

FIG. 5 is a perspective exploded partial view of a third embodiment of the hitch connection for connecting the cart to the vehicle illustrated in FIG. 1;

FIG. 6 is a side elevational view of the third embodiment of the hitch connection of FIG. 5 shown in a locked position; and FIG. 7 is a side elevational view, like FIG. 6, of the third embodiment of the hitch connection of FIG. 5 shown in an unlocked position.

DETAILED DESCRIPTION OF THE PREFERRED EMBODYMENTS

Figure 1:
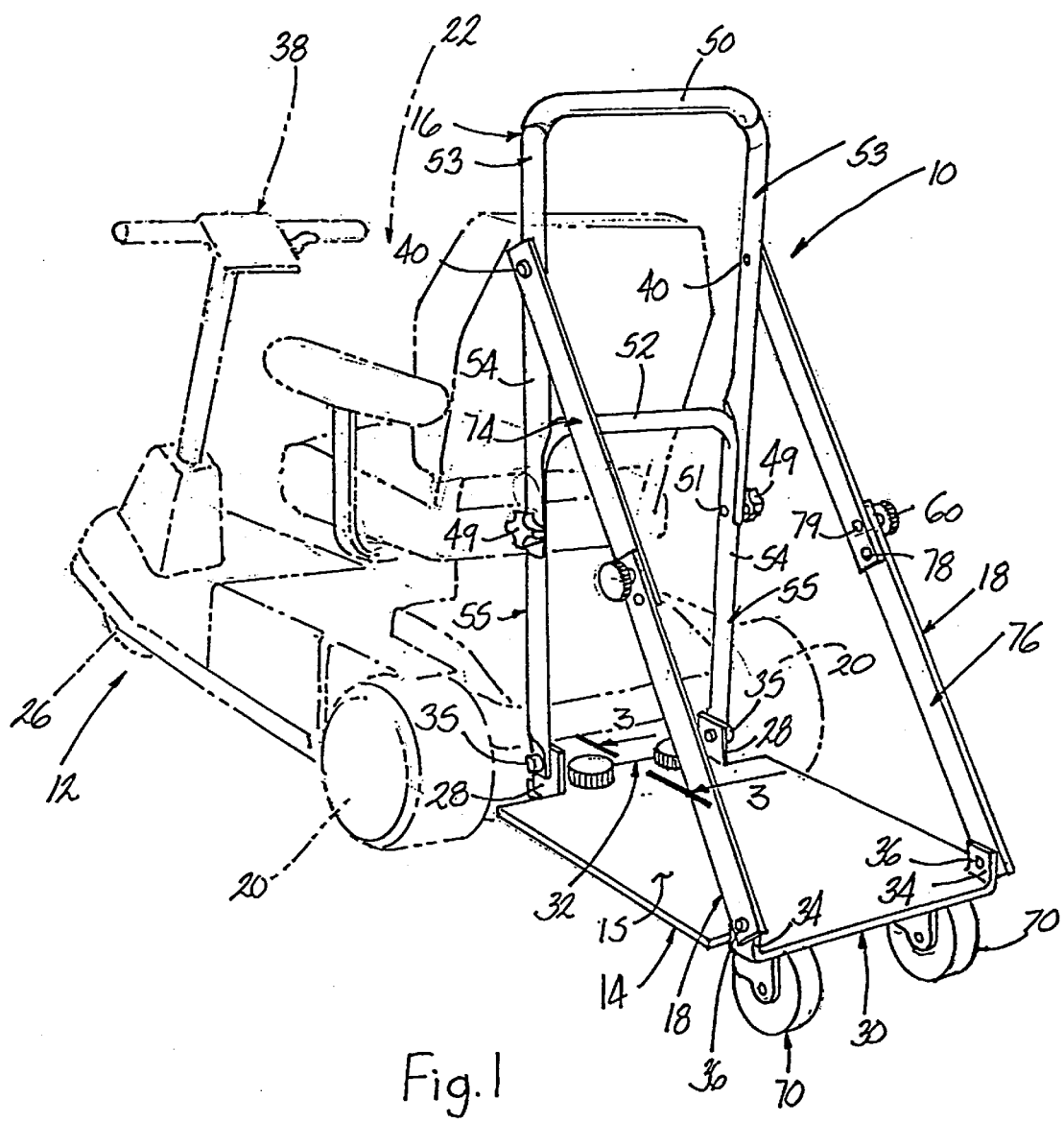
FIG. 1 is a perspective view of a cart according to the invention with a personal mobility vehicle shown in phantom lines.

As shown generally in FIG. 1, a collapsible and detachable cart 10 is attached to a personal mobility vehicle 12, such as a three-wheel scooter as shown. The cart 10 includes a platform base 14, an upright support rail 16 supported by side braces 18, and further having a pair of swivel casters 70.

Figure 3:
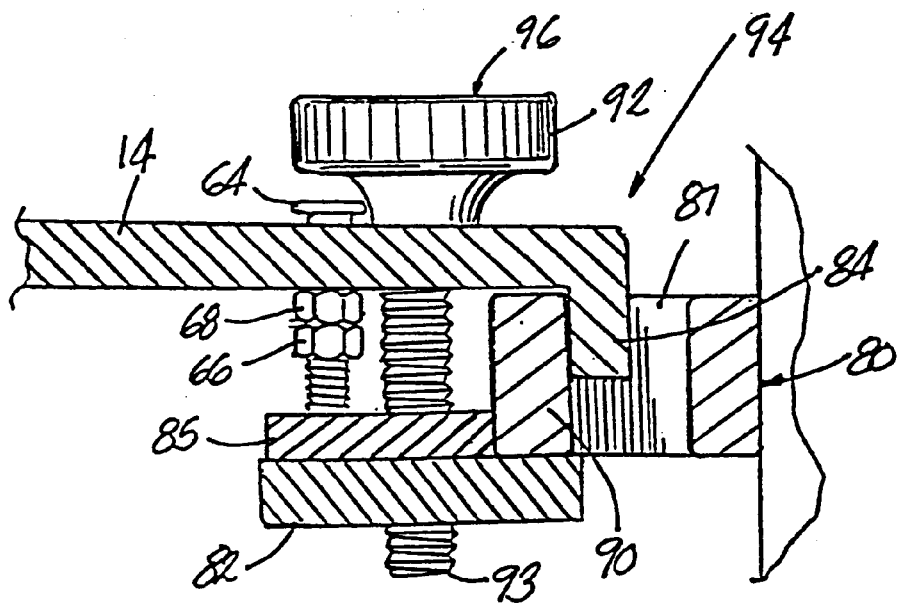
FIG. 3 is a partial sectional view cart shown in FIG. 1 and illustrating the hitch connection for connecting the cart to the vehicle.
Figure 4:
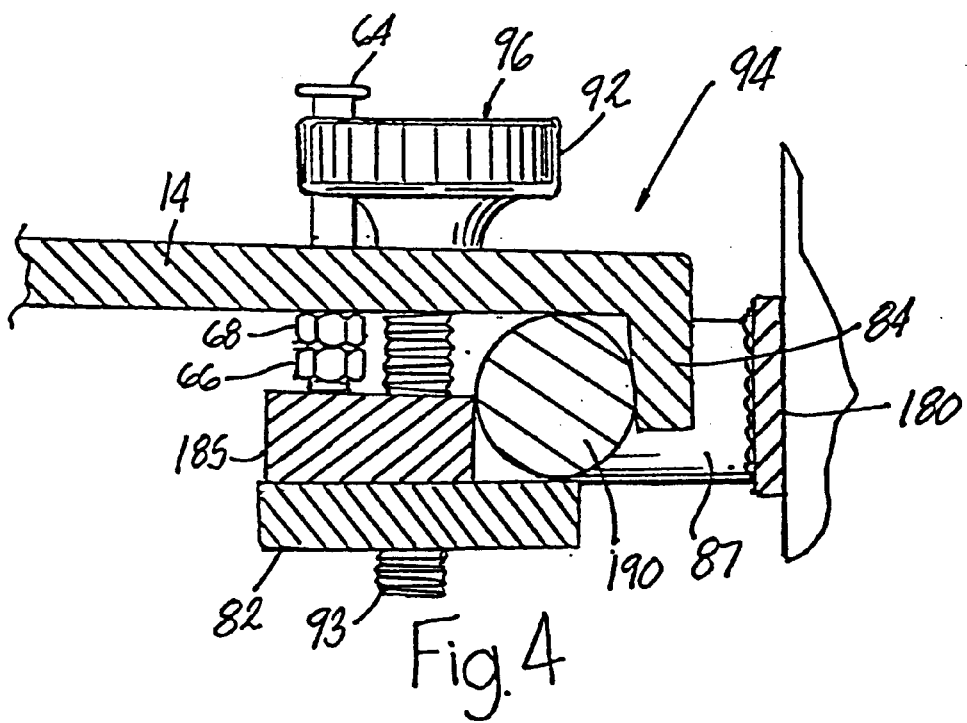
FIG. 4 is a partial sectional view, like FIG. 3, illustrating a second embodiment of a hitch connection for connecting the cart to the vehicle.

The platform base 14 includes an upper surface means 15, a rear end 30, and a front end 32. A first and a second embodiment of a hitch connection for securing the cart 10 to the vehicle 12 is best illustrated in FIGS. 3 and 4, where a transverse lip 84 extends downwardly from the front end 32 of the cart 10, and further includes a connector 94 for attaching the cart 10 to the vehicle 12 and mounting tabs 28 disposed at opposite ends and each having an aperture therethrough for pivotally mounting the support rail 16 via pins 35. The support rail 16 includes a pair of parallel arms 54 joined by a hand grip 50 at their uppermost end and by a cross-bar 52 roughly equidistant from the platform base 14 and the hand grip 50. The parallel arms 54 consist of upper and lower U-shaped portions 53, 55 joined at each side by a threaded screw 51 inserted through aligned apertures of each portion and secured in a threaded aperture of a knob 49.

The rear end 30 of the platform base 14 also includes mounting tabs 34 having apertures therein for pivotally mounting the side braces 18 via pins 36. Each side brace 18 includes an upper portion 74 and a lower portion 76, which are pivotally joined by a pin 78, and held rigid by an adjacent screw 79 that is threaded through a pair of aligned apertures in the joining ends of the upper and lower portions 74, 76, respectively. The screw 79 is held secure by a hand-turned knob 60 having a threaded aperture centrally disposed therein, thereby preventing rotation about the pin 78. The side braces 18 are a pair of arms extending from the mounting tabs 34 at the rear end 30 of the platform base 14 to removable pins 40, which releasably secure the upper portions 74 of the side braces 18 and are disposed approximately intermediately between the cross-bar 52 and the hand grip 50 on each side brace 18. In an alternative embodiment, the upper portions of the side braces can be attached to the U-shaped portion 55 rather than the U-shaped portion 53, and the relative size of the U-shaped portion 55 can be larger. This alternative embodiment may make it easier to collapse the braces.

Figure 2:
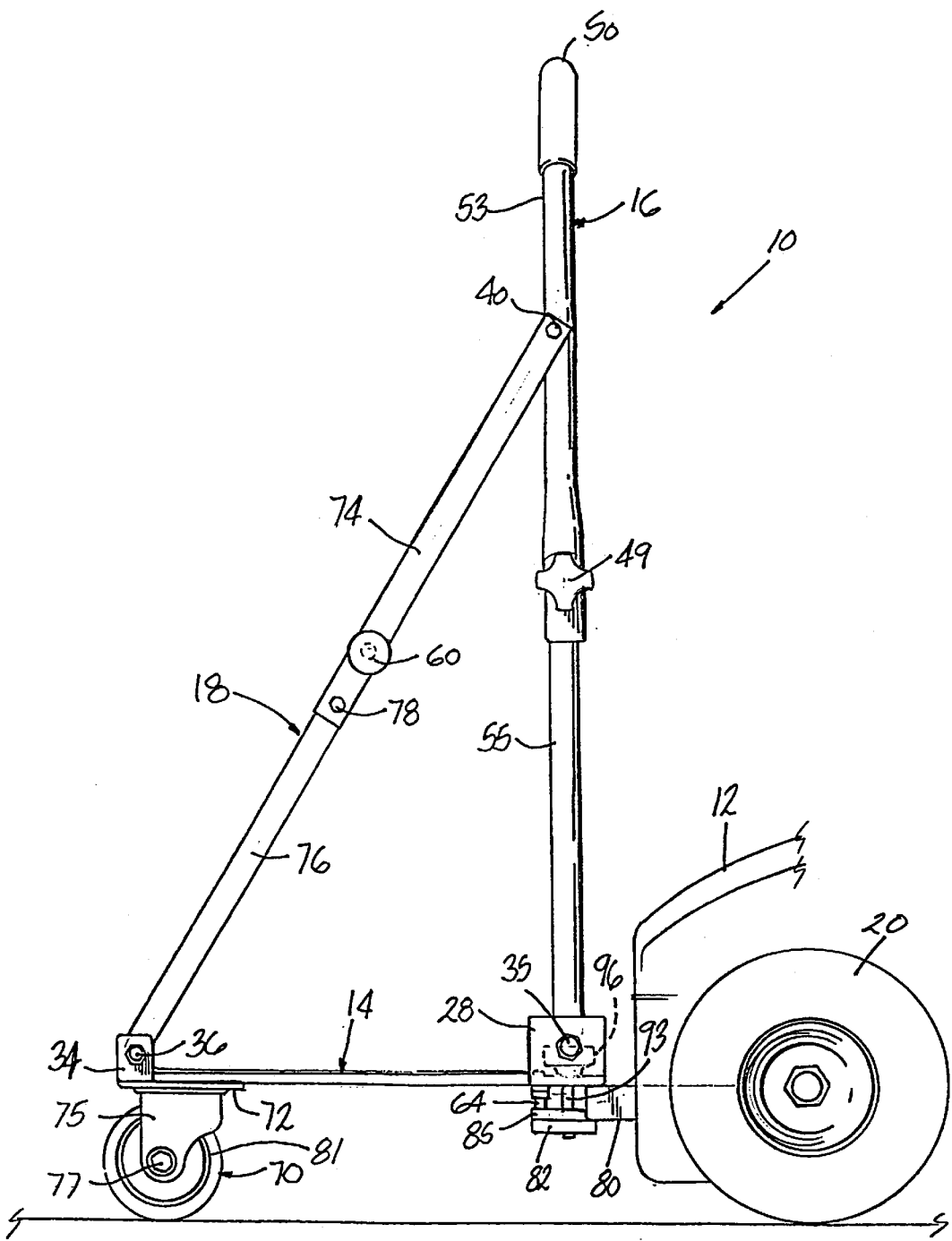
FIG. 2 is a partial side view of the cart and a partial side of the vehicle shown in FIG. 1.

As best shown in FIGS. 1 and 2, the underside of the rear end 30 of the platform base 14 includes a pair of swivel casters 70 mounted adjacent to the sides thereof. The swivel casters 70 are typical swivel casters including a base 72 with parallel arms 75 supporting an axle 77 on which wheels 81 rotate. The parallel arms 75 are mounted for axial rotation about the base 72 in a direction transverse the plane of the platform 14, whereby the wheels 81 accommodate the turning motion of the vehicle 12 with the rigidly secured cart 10.

As best shown in FIGS. 2–4, the personal mobility vehicle 12 optionally includes a lifting handle 80,180 mounted to a lower rear section of the vehicle 12 body for lifting the rear wheels of the vehicle. In the first and the second embodiment, the lifting handle 80,180 is used as the hitch for the cart 10. More specifically, the lifting handle 80,180 includes a pair of parallel support arms 87 spaced near opposite sides of the lower rear end of the vehicle 12 body. Between these arms 87 is disposed a hand grip 90,190, thereby forming a substantially C-shaped lifting handle 80,180 on the cart 10 body. FIG. 4 shows the second embodiment in which the lifting handle 180 having the cylindrical hand grip 190 is joined by parallel arms 87 to the vehicle 12 body.

In the first and the second embodiment of the hitch connection shown in FIGS. 3 and 4, the connector 94 includes a pair of spaced-apart threaded fasteners 96, a block 85,185, and a hitch plate 82. The fasteners 96 are threaded through pairs of slots 24 in the platform base 14 and aligned pairs of respective apertures in the block 85,185 and the hitch plate 82. The block 85,185 is positioned between the hitch plate 82 and platform base 14 and held in position by the fasteners 96. The lifting handle 80,180 is blocked against horizontal movement by the lip 84 of the platform base 14 and the block 85,185.

The lifting handle 80,180 of the first and second embodiments, respectively, is adapted to be the hitch for the cart 10 by hanging the lip 84, which extends downwardly from the front-most end of the front end 32, over the hand grip 90,190 so that it is disposed between the cart 10 body and the hand grip 90,190, but resting against an inside surface of the hand grip 90,190. A hitch plate 82, disposed in a plane parallel and subjacent to the platform base 14 rests against a lower surface of the hand grip 90,190 and extends rearwardly toward the center of the platform base 14.

The hitch plate 82 includes a pair of threaded apertures that receive the pair of threaded fasteners 96 each having a coaxial knob 92 and thread 93, which are inserted through a pair of respectively aligned apertures in the front end 32 of the platform base 14. The hitch plate 82 extends from below the grip portion 90,190 rearwardly to support the block 85,185, which, when secured in place, provides support against rearward movement of the grip portion 90,190 away from the lip 84. As shown in FIG. 4, if the tubular hand grip portion 190 is included on the vehicle 12, a block 185 that is taller relative to the handle 190 should be used. The apertures of the hitch plate 82, the platform 14, and the block 85,185 are aligned so that the threaded fasteners 96 actuated by the knobs 92 clamp together the hitch plate 82 and the platform 14 with the hand grip 90,190 pressed therebetween.

The front end 32 of the platform base 14 further includes another aperture slightly rearward and intermediate of the pair of slots 24 receiving the threaded fasteners 96. A support screw 64 is threaded through this third aperture until a tip of the screw strikes the block 85,185. The support screw 64 is held in this position by threading a first nut 68 until it is tight against an underside of the platform base 14. The first nut 68 is secured against inadvertent loosening by tightly threading a lock nut 66 against and subjacent the first nut 68.

To detach the cart 10 from the vehicle 12, turn the knobs 92 to unthread the fasteners 96 and thereby release the hitch plate 82. Once the fasteners 96 are loosened, they travel in the slots 24 so that the platform base 14 can be shifted forward and then lifted to remove the lip 84 from its inside engagement with the hand grip 90,190 of the handle 80,180.

Referring now to FIG. 5, an exploded partial view of the third embodiment of the invention is shown. The connector assembly for the cart comprises a first L-shaped bracket 100, a second L-shaped bracket 114, and a latch 126. The first L-Shaped bracket 100 comprises a vertical leg 110 having a vertically extending slot 102 and a horizontal leg 112 having horizontally and vertically spaced apertures 104. The second L-shaped bracket 114 comprises a vertical leg 122 having two vertically spaced and horizontally aligned circular apertures 116 and a horizontal leg 124 having an upper face 117 and a U-shaped recess 118 extending downwardly therefrom. The bracket 114 further comprises a circular aperture 120 located near the bottom of and spaced intermediate the ends of the horizontal leg 124 and a smaller circular aperture 121 located proximate the U-shaped recess 118 and intermediate the recess 118 and the vertical leg 122.

The latch 126 comprises a straight portion 134 and a curved portion 132, which has a lower face 129 and an U-shaped recess 130 extending upwardly therefrom. The latch 126 further comprises a circular aperture 128 located approximately at the junction between the straight portion 134 and the curved portion 132. The connector assembly further comprises a rod 140 having a threaded end 142, which mates with a threaded nut 144. The rod 140 is rigidly connected to the front end 32 of the platform 14 of the cart 10 so that the rod 140 is maintained at approximately the same height as the platform 14 when in a level position.

To assemble the connector assembly of FIGS. 5–7, the first bracket 100, the second bracket 114, the latch 126, and the pin 146 are each placed on both sides of the lower rear portion of the vehicle 12. First, the first bracket 100 is secured to the vehicle 12 such that the vertical leg 110 of the bracket 100 extends upwardly and is located rearward of the vehicle 12, as shown in FIG. 5, by aligning the apertures 104 of the bracket 100 with corresponding threaded apertures 108 on the vehicle 12 and inserting equally threaded fasteners 106 through apertures 104 and into apertures 108.

Next, the vertically spaced apertures 116 of the bracket 114 are aligned with the vertically extending slot 102 of the bracket 100 such that the vertical leg 122 thereof extends upwardly and such that the horizontal leg 124 thereof extends toward the cart 10, as shown in FIG. 5. Next, threaded fasteners 138 are inserted through the apertures 116 and through the slot 102 of the bracket 100 and secured to the fasteners 138 with equally threaded nuts 139. The bracket 114 is free to slide vertically with respect to the bracket 100 as the fasteners 138 slide in the vertical slot 102 of the bracket 100.

Next, the circular aperture 128 of the latch 126 is aligned with the circular aperture 120 of the second bracket 114 such that the latch 126 is further to the outside of the vehicle 12 and such that the straight portion 134 of the latch 126 extends towards the vehicle 12 and the curved portion 132 of the latch 126 extends toward the cart 10. Next, a pin 136 is inserted through the aperture 128 of the latch 126 and, subsequently, through the aperture 120 of the second bracket 114 such that the latch 126 is free to rotate about the pin 136.

To secure the cart 10 to the vehicle 12, the rod 140 of the cart 10 is lowered into the U-shaped recess 118 of the second bracket 114 until it rests in a lower portion 119 of the recess 118. Next, the latch 126 is rotated about the pin 136 until the U-shaped recess 130 of the latch 126 engages the rod 140 on an upper surface thereof Next, the pin 146 is inserted into the aperture 121 of the second bracket 114. The aperture 121 is located such that, when the latch 126 engages the rod 140 to secure the cart 10, the pin 146 in the aperture 121 rests rigidly against an upper surface 127 of the latch 126. This locked position is shown in FIG. 6. Corresponding actions are then taken on both sides of the vehicle 12 to attach the cart 10 to the vehicle 12.

To detach the cart 10 from the vehicle 12, the pin 146 is removed from the aperture 121 of the second bracket 114 and the latch 126 is rotated such that the curved portion 132 thereof moves out of locking engagement with the rod 140. Next, the front portion 32 of the platform 14 of the cart 10 is moved upwardly so as to remove the rod 140 from the U-shaped recess 118 of the second bracket 114. A final stage of the detachment of the cart 10 from the vehicle 12 is shown in FIG. 7. Corresponding actions need to be taken on both sides of the vehicle 12 to detach the cart 10 from the vehicle 12.

Once the cart 10 is removed from the vehicle 12, the support rail 16 and side braces 18 can be collapsed to facilitate efficient storage of the cart 10. First, the pins 40 are removed and the knobs 60 joining the upper and lower portions 74, 76 of the side braces 18 are loosened and the screws 79 are removed so that the upper and lower portions 74, 76 can pivot toward one another about pins 78. More particularly, the joints connecting the upper and lower portions 74, 76 of the braces 18 are collapsed inwardly at the pins 78 so that the threaded knob 60 is moved toward the junction of the support rail 16 and the platform 14.

Once the side braces 18 are detached and collapsed, the same can be done to the support rail 16. First, the threaded knobs 49 securing the upper portion 53 to the lower portion 55 of the support rail 16 at approximately the intersection of the cross-bar 52 and each tubular arm 54 is loosened so that the upper portion 53 can pivot relative to the lower portion 55. The lower portion 55 is then pivoted about the mounting tabs 28 so that the lower portion 55 lies substantially planar with the platform base 14. Then, the upper portion 53 is pivoted toward the front end 32 of the platform base 14 so that the lower portion 55 substantially nests in the upper portion 53. Once the cart 12 has been collapsed and detached in this manner, it is easily stored, for example, in a trunk or passenger compartment of an automobile. When it is needed for use, the cart can be quickly assembled by reversing the above description for collapsing and detaching the cart.

It should be evident to one of skill in the art that the collapsible support rail 16 and side braces 18 can be used on other cart types, such as those having an articulated connection to the vehicle 12 or wheels rotationally mounted on fixed supports.

In all embodiments of the invention, the cart 10 has a horizontally rigid connection to the personal mobility vehicle 12 so that the vehicle 12 and cart 10 will move along a horizontal course as one unit. The swivel casters 70 enable the cart to turn with the vehicle 12 to which it is rigidly connected. Thus, the cart 10 and vehicle 12 can turn and back up in a small area, as there is no trailer-type cart to maneuver and steer when doing so. Although the cart is pivotally mounted to the vehicle about a transverse horizontal axis in the third embodiment (FIGS. 5–7), the connection is still rigid with respect to a vertical axis so that the connection assembly functions in use as the first two embodiments, i.e., the cart 10 and vehicle 12 can turn and back up in a small area, as there is no trailer-type cart to maneuver and steer when doing so.

The platform base 14 can be any length, depending on the proposed function. The upper surface means 15 of platform base 14 shown is suitable for standing, but can be made longer and can accommodate a chair for seated transport.

Reasonable variation and modification are possible within the spirit of the foregoing specification and drawings without departing from the scope of the invention.

What is claimed is:

1. For use with a personal mobility vehicle having a rear portion, a cart comprising:

a platform base having an upper surface means for supporting a user, an underside, a front end, and a rear portion;

a connector assembly mounted to the front end of the platform base and adapted to rigidly connect the platform base to the rear portion of the personal mobility vehicle at least in a horizontal plane, the connector assembly including a hitch plate and a pair of threaded fasteners that are threaded into the hitch plate to clamp an elongated bar handle on the rear portion of the cart between the platform base and the hitch plate;

a pair of swivel casters mounted to the rear portion of the platform base.

2. A cart according to claim 1 wherein the swivel casters are mounted adjacent the rear end of the underside of the platform base.

3. A cart according to claim 1 wherein the connector assembly further comprises a support screw threaded into the platform base or the hitch plate and positioned rearwardly of the threaded fastener for counterbalancing the clamping force of the handle on the hitch plate.

4. A cart according to claim 3 wherein the connector assembly further comprises a block that is adapted to rearwardly abut the handle and is positioned between the support screw and either the hitch plate or the platform base for preventing rearward movement of the handle with respect to the platform base.

5. A cart according to claim 4 wherein the platform base includes a transversely extending lip projecting downwardly at the front end thereof and adapted to prevent forward movement of the handle with respect to the platform base.

6. A cart according to claim 1 wherein the connector further comprises a block that is adapted to rearwardly abut the handle and is positioned between the support screw and either the hitch plate or the platform base and is adapted to prevent rearward movement of the handle with respect to the platform base.

7. A cart according to claim 6 wherein the platform base includes a transversely extending lip projecting downwardly at the front end thereof and is adapted to prevent forward movement of the handle with respect to the platform base.

8. For use with a personal mobility vehicle having a rear portion, a cart comprising:

a platform base having an upper surface means for supporting a user, an underside, a front end, and a rear portion;

a connector assembly mounted to the front end of the platform base and adapted to rigidly connect the platform base to the rear portion of the personal mobility vehicle at least in a horizontal plane;

a pair of swivel casters mounted to the rear portion of the platform base; and a support rail extending upwardly from the front end of the platform base and adapted to provide support to the user.

9. A cart according to claim 8 and further comprising a pair of side braces extending from the rear portion of the platform base to the support rail for bracing the support rail.

10. A cart according to claim 9 wherein the support rail is pivotably mounted to the platform base so that the support rail can be collapsed for storage.

11. A cart according to claim 10 wherein the side braces are pivotably mounted to the platform base so that the side braces can be collapsed for storage.

12. A cart according to claim 11 wherein the support rail has an upper portion and a lower portion and the upper portion is pivotably connected to the lower portion so that the support rail can be collapsed for storage by pivoting the upper portion toward the lower portion.

13. A cart according to claim 12 wherein each side brace has an upper portion and a lower portion and the upper portion is pivotably connected to the lower portion so that the side braces can be collapsed for storage by pivoting the upper portion toward the lower portion.

14. A cart according to claim 13 wherein a removable pin releasably connects the upper portion of each side brace to the upper portion of the support rail.

15. A cart according to claim 13 wherein the connector assembly comprises a hitch plate and a pair of threaded fasteners that are threaded into the hitch plate to clamp an elongated bar handle on the rear portion of the cart between the platform base and the hitch plate.

16. A cart according claim 15 wherein the connector further comprises a block that is adapted to rearwardly abut the handle and is positioned between the hitch plate and the platform base and is adapted to prevent rearward movement of the handle with respect to the platform base.

17. A cart according to claim 16 wherein the platform base includes a transversely extending lip projecting downwardly at the front end and is adapted to prevent forward movement of the handle with respect to the platform base.

18. A cart according to claim 17 wherein the connector further comprises a support screw threaded into the platform base or the hitch plate and positioned rearwardly of the threaded fastener for counterbalancing the clamping force of the handle on the hitch plate.

19. A cart according to claim 13 wherein the connector assembly comprises a pair of first plates adapted to be rigidly attached to the rear portion of the personal mobility vehicle, a pair of second plates attached to the front end of the platform base, and a vertical slidable coupling between each pair of first and second plates whereby the front end of the platform base is adapted to be vertically adjustable with respect to the rear portion of the personal mobility vehicle.

20. A cart according to claim 19 wherein the slidable coupling includes a vertical slot in one of the first and second plate, apertures in the other of the first and second plates and pin connectors extending through the apertures and the vertical slot.

21. A cart according to claim 20 wherein the second plates are pivotally connected to the front end of the platform.

22. A cart according to claim 21 wherein the pivotal connection between the second plates and the front end of the platform comprises a rod mounted horizontally and across the front end of the platform, a U-shaped recess in the second plates and a latch pivotally mounted to each of the second plates and adapted to releasably retain the rod in the U-shaped recess in the second plates when the rod is positioned in the U-shaped recesses in the second plates.

23. For use with a personal mobility vehicle having a rear portion, a cart comprising:
    a platform base having an upper surface means for supporting a user, an underside, a front end, and a rear portion;
    a connector assembly to the front end of the platform base and adapted to rigidly connect the platform base to the rear portion of the personal mobility vehicle at least in a horizontal plane, the connector assembly including a pair of first plates adapted to be rigidly attached to the rear portion of the personal mobility vehicle, a pair of second plates attached to the front end of the platform base, and a vertical slidable coupling between each pair of first and second plates whereby the front end of the platform base is adapted to be vertically adjustable with respect to the rear portion of the personal mobility vehicle; and
    a pair of swivel casters mounted to the rear portion of the platform base.

24. A cart according to claim 23 wherein the slidable coupling includes a vertical slot in one of the first and second plate, apertures in the other of the first and second plates and pin connectors extending through the apertures and the vertical slot.

25. A cart according to claim 24 wherein the second plates are pivotally connected to the front end of the platform.

26. A cart according to claim 25 wherein the pivotal connection between the second plates and the front end of the platform comprises a rod mounted horizontally and across the front end of the platform, a U-shaped recess in the second plates and a latch pivotally mounted to each of the second plates and adapted to releasably retain the rod in the U-shaped recess in the second plates when the rod is positioned in the U-shaped recesses in the second plates.

27. In combination with a personal mobility vehicle having front and rear portions, front and rear wheels adapted to roll on a supporting surface, a seat for supporting an occupant and a steering and control column at the front portion, a cart comprising:
    a platform base having an upper surface means for supporting a user, an underside, a front end, and a rear portion;
    a connector assembly mounted to the front end of the platform base and rigidly connecting the platform base to the rear portion of the personal mobility vehicle;
    a pair of wheels mounted to the underside of the platform base at a rear portion thereof and in substantially supporting relationship with the supporting surface for supporting the rear portion of the platform.

28. A cart according to claim 27 wherein the pair of wheels are swivel caster wheels.

29. A cart according to claim 27 wherein the cart further includes a support rail extending upwardly from the front end of the platform base and adapted to provide support to the user.

30. A cart according to claim 29 and further comprising a pair of side braces extending from the rear end of the platform base to the support rail for bracing the support rail.

31. A cart according to claim 30 wherein the support rail is pivotably mounted to the platform base so that the support rail can be collapsed for storage.

32. A cart according to claim 31 wherein the side braces are pivotably mounted to the platform base so that the side braces can be collapsed for storage.

33. A cart according to claim 32 wherein the support rail has an upper portion and a lower portion and the upper portion is pivotably connected to the lower portion so that the support rail can be collapsed for storage by pivoting the upper portion toward the lower portion.

34. A cart according to claim 33 wherein each side brace has an upper portion and a lower portion and the lower portion is pivotably connected to the lower portion so that the side braces can be collapsed for storage by pivoting the upper portion toward the lower portion.

35. A cart according to claim 34 wherein a removable pin releasably connects the upper portion of each side brace to the upper portion of the support rail.

36. A cart according to claim 27 wherein the connector assembly comprises a pair of first plates adapted to be rigidly attached to the rear portion of the personal mobility vehicle, a pair of second plates attached to the front end of the platform base, and a vertical slidable coupling between each pair of first and second plates whereby the front end of the platform base is adapted to be vertically adjustable with respect to the rear portion of the personal mobility vehicle.

37. A cart according to claim 36 wherein the slidable coupling includes a vertical slot in one of the first and second plate, apertures in the other of the first and second plates and pin connectors extending through the apertures and the vertical slot.

38. A cart according to claim 37 wherein the second plates are pivotally connected to the front end of the platform.

39. A cart according to claim 38 wherein the pivotal connection between the second plates and the front end of the platform comprises a rod mounted horizontally and across the front end of the platform, a U-shaped recess in the second plates and a latch pivotally mounted to each of the second plates and adapted to releasably retain the rod in the U-shaped recess in the second plates when the rod is positioned in the U-shaped recesses in the second plates.

\* \* \* \* \*